United States Patent
De Jesus et al.

(10) Patent No.: US 7,775,100 B2
(45) Date of Patent: Aug. 17, 2010

(54) REAL-TIME MANAGEMENT SYSTEM FOR SLICKLINE/WIRELINE

(75) Inventors: Orlando De Jesus, Frisco, TX (US); Richard Mineo, Richardson, TX (US); Jerry C. Foster, Lewisville, TX (US); Syed Hamid, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 12/239,290

(22) Filed: Sep. 26, 2008

(65) Prior Publication Data

US 2009/0013774 A1 Jan. 15, 2009

Related U.S. Application Data

(62) Division of application No. 11/284,863, filed on Nov. 22, 2005, now Pat. No. 7,444,861.

(51) Int. Cl.
*G01L 5/00* (2006.01)
(52) U.S. Cl. .................................. 73/152.59
(58) Field of Classification Search .............. 73/152.49, 73/152.59
See application file for complete search history.

(56) References Cited

U.S. PATENT DOCUMENTS

| | | | |
|---|---|---|---|
| 4,719,587 A | 1/1988 | Berte | |
| 5,813,480 A | 9/1998 | Zaleski et al. | |
| 5,826,654 A | 10/1998 | Adnan et al. | |
| 6,230,822 B1 | 5/2001 | Sullivan et al. | |
| 6,419,032 B1 | 7/2002 | Sullivan et al. | |
| 6,543,312 B2 | 4/2003 | Sullivan et al. | |
| 6,681,633 B2 | 1/2004 | Schultz et al. | |
| 6,712,160 B1 | 3/2004 | Schultz et al. | |
| 6,722,450 B2 | 4/2004 | Schultz et al. | |
| 6,732,052 B2 | 5/2004 | Macdonald et al. | |
| 6,817,425 B2 | 11/2004 | Schultz et al. | |
| 7,096,961 B2 | 8/2006 | Clark et al. | |
| 7,140,452 B2 * | 11/2006 | Hutchinson | 175/39 |
| 7,163,065 B2 * | 1/2007 | Zhang et al. | 166/385 |

(Continued)

OTHER PUBLICATIONS

International Search Report and Written Opinion issued Nov. 13, 2008, for International Patent Application No. PCT/US06/61116, 7 pages.

(Continued)

*Primary Examiner*—John Fitzgerald
(74) *Attorney, Agent, or Firm*—Marlin R. Smith

(57) ABSTRACT

A real-time line management system and associated methods. A line management system for use in conjunction with an operation in a subterranean well includes a line installed in the well during the operation, and a computing device which indicates a used life of the line during the operation. A method of managing a line used in an operation in a subterranean well includes the steps of: installing the line in the well during the operation; and determining a used life of the line while the line is installed in the well. A method of managing a line used in multiple operations in one or more subterranean wells includes the steps of: estimating conditions which will be experienced by the line during a future operation; and predicting before the future operation what a used life of the line will be after the line is used in the future operation.

6 Claims, 9 Drawing Sheets

U.S. PATENT DOCUMENTS

| | | | |
|---|---|---|---|
| 7,165,612 B2 | 1/2007 | McLaughlin | |
| 7,346,456 B2 * | 3/2008 | Le Bemadjiel | 702/9 |
| 7,357,179 B2 | 4/2008 | Zheng et al. | |
| 7,444,861 B2 | 11/2008 | De Jesus et al. | |
| 2002/0120401 A1 * | 8/2002 | Macdonald et al. | 702/6 |
| 2002/0139581 A1 * | 10/2002 | Schultz et al. | 175/39 |
| 2004/0139806 A1 | 7/2004 | Christmas | |
| 2005/0263281 A1 | 12/2005 | Lovell et al. | |
| 2006/0096753 A1 * | 5/2006 | Zheng et al. | 166/250.01 |
| 2006/0142945 A1 * | 6/2006 | McLaughlin | 702/9 |
| 2007/0113640 A1 * | 5/2007 | De Jesus et al. | 73/158 |

OTHER PUBLICATIONS

Davis, Glenn, "HES Wireline Management Program, Report No. OWS-D97-002", Slickline Technology Team, 5 pages, Nov. 17, 1998.

OTC 7325, "Coiled Tubing Life Prediction", V. Avakov, J. Foster, E. Smith, 8 pages, 1993.

SPE 71560, "Field Validation fo 3-Dimentional Drag Model for Tractor and Cable-Conveyed Well Intervention", A. Mcspadden, P. Brown, T. Davis, 8 pages, 2001.

International Preliminary Report on Patentability and Written Opinion issued Feb. 5, 2009, for International Patent Application Serial No. PCT/US06/61116, 6 pages.

* cited by examiner

REAL-TIME MANAGEMENT SYSTEM FOR SLICKLINE/WIRELINE

CROSS-REFERENCE TO RELATED APPLICATION

This application is a division of prior application Ser. No. 11/284,863 filed on Nov. 22, 2005. The entire disclosure of this prior application is incorporated herein by this reference.

BACKGROUND

The present invention relates generally to equipment utilized and operations performed in conjunction with subterranean wells and, in an embodiment described herein, more particularly provides a real-time management system for slickline, wireline and other types of lines used in wells.

It is well known that the useful life of a line, such as a slickline or wireline, is shortened each time the line is used in a well operation. For example, the line is subjected to bending stresses each time the line passes over a sheave or pulley when it is installed in a well. Eventually, the line will be sufficiently fatigued and will fail if remedial actions are not undertaken prior to the failure.

Of course, different sections of the line are subjected to different stresses and different frequencies of stresses during an operation, making it very difficult to keep track of which section of the line has been fatigued and to what degree. This difficulty is compounded when the line is used in multiple operations over time.

In the past, reliance has been placed on an operator's experience to determine when a portion of the line should be discarded, a line should be reversed, or the line should be replaced to prevent failure of the line. To assist in this determination, operators kept manual logs of the details of an operation. For example, an operator might record in a log the details of jarring with the line at 3,000 feet, so that in the future the same or a different operator would know that the line had been fatigued to some degree at that section of the line.

In the more recent past, databases including spreadsheets have been used to more accurately accumulate the details of operations performed using a line. Using the accumulated information, a used life of the line can be determined after each operation. Unfortunately, manual entry of the details of each operation still has to be made. This method allows errors to be made in data entry, relies on operators to remember to make the data entry after each operation, and allows specific details of each operation to be omitted. For example, an operator might remember to record the details of hour after hour spent jarring at a certain depth (perhaps because this stands out as being especially important and memorable), but forget to record the details of a routine plug setting or sleeve shifting using the line.

Therefore, it may be seen that improvements are needed in the art of line management. It is among the objects of the present invention to provide such improvements.

SUMMARY

In carrying out the principles of the present invention, a line management system and associated methods are provided which solve at least one problem in the art. One example is described below in which data regarding conditions experienced by a line are recorded in real-time using sensors to detect the conditions, and this data is used to provide a real-time determination of a used life of the line. Another example is described below in which future operations are planned in a manner which minimizes the used life of a line.

In one aspect of the invention, a line management system for use in conjunction with an operation in a subterranean well includes a line installed in the well during the operation, and a computing device which indicates a used life of the line during the operation. In this manner, an operator can be alerted during the operation when a predicted remaining useful life of the line decreases to an unacceptable level, so that failure of the line can be avoided.

In another aspect of the invention, a method of managing a line used in an operation in a subterranean well includes the steps of: installing the line in the well during the operation; and determining a used life of the line while the line is installed in the well. Preferably, sensors are used to monitor conditions experienced by the line while it is installed in the well, and outputs of the sensors are used in determining the used life of the line in real-time.

In yet another aspect of the invention, a method of managing a line used in multiple operations in one or more subterranean wells includes the steps of: estimating conditions which will be experienced by the line during the future operation; and predicting before the future operation what a used life of the line will be after the line is used in the future operation. Where multiple future operations are to be performed, a sequence of the future operations can be selected to minimize the used life of the line after the operations. In addition, discarding of portions of the line and/or reversal of the line can be planned to minimize the used life of the line after the operations.

These and other features, advantages, benefits and objects of the present invention will become apparent to one of ordinary skill in the art upon careful consideration of the detailed description of representative embodiments of the invention hereinbelow and the accompanying drawings, in which similar elements are indicated in the various figures using the same reference numbers.

DETAILED DESCRIPTION

It is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

In the following description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figure 1:
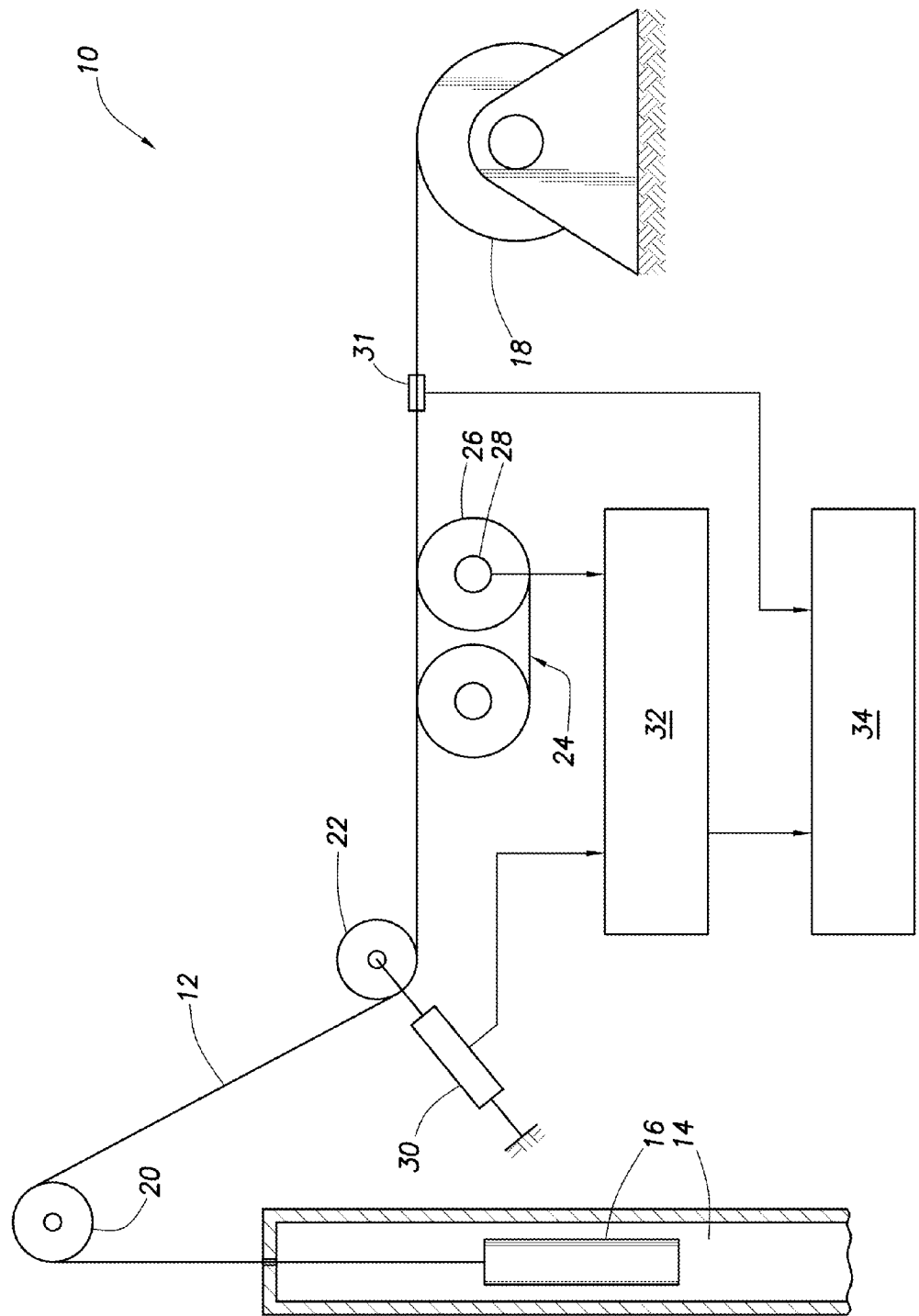
FIG. 1 is a schematic view of a line management system embodying principles of the present invention.

Representatively illustrated in FIG. 1 is a line management system 10 which embodies principles of the present invention. In the system 10, a line 12 (such as a slickline, wireline or other type of line) is installed in a wellbore 14 of a well in order to perform an operation in the well. The operation could be any type of operation which can be performed for the well. For example, the operation could include one or more of logging, jarring, shifting a sleeve valve, adjusting downhole equipment such as a choke, installing or replacing a chemical injection valve, setting or retrieving a plug, and/or any other operation or combination of operations, including tripping the line 12 in and out of the wellbore 14.

One or more well tools 16 are attached at a terminal end of the line 12. The well tools 16 could be any type or combination of well tools, such as jars, weights, shifting tools, logging tools, running tools, valves, plugs, chokes, locks, etc.

The line 12 is spooled on a reel 18, which may be included as part of a portable unit transported to the well so that specific operations can be performed at the well. Alternatively, the reel 18 and other components can be permanently mounted at the well.

Between the reel 18 and the wellbore 14, the line 12 passes over two or more pulleys or sheaves 20, 22. The line 12 also traverses a measurement device 24 which includes a counter wheel 26 and a rotational displacement sensor 28. The sensor 28 is capable of providing an output indicative of a direction, cumulative total and speed of the displacement of the line 12.

Another sensor 30 is connected to the lower sheave 22. The sensor 30 is capable of providing an output indicative of a load applied to the line 12. For example, when the tools 16 are suspended from the line 12 in the wellbore 14, a tensile load is applied to the line due to the weight of the tools, and the sensor 30 will detect this load as an outward biasing force applied to the lower sheave 22.

It will be appreciated by those skilled in the art that the tensile load applied to the line 12 due to the weight of the tools 16 results in tensile stress in the line. Stress in the line 12 can also be caused by other circumstances, for example, jarring, shifting a sleeve, etc.

Of particular concern are bending stresses produced in the line 12 when it passes over the sheaves 20, 22 and the counter wheel 26. Prolonged repetition of these bending stresses in a certain section of the line 12 (as might occur, for example, in jarring operations) can fatigue the line to the point of failure.

Of course, other conditions and combinations of conditions can cause failure of the line 12, as well. For example, the line 12 could be exposed to chemicals in the well (e.g., hydrogen sulfide) which make the line more susceptible to fatigue failure, etc.

Figure 2:
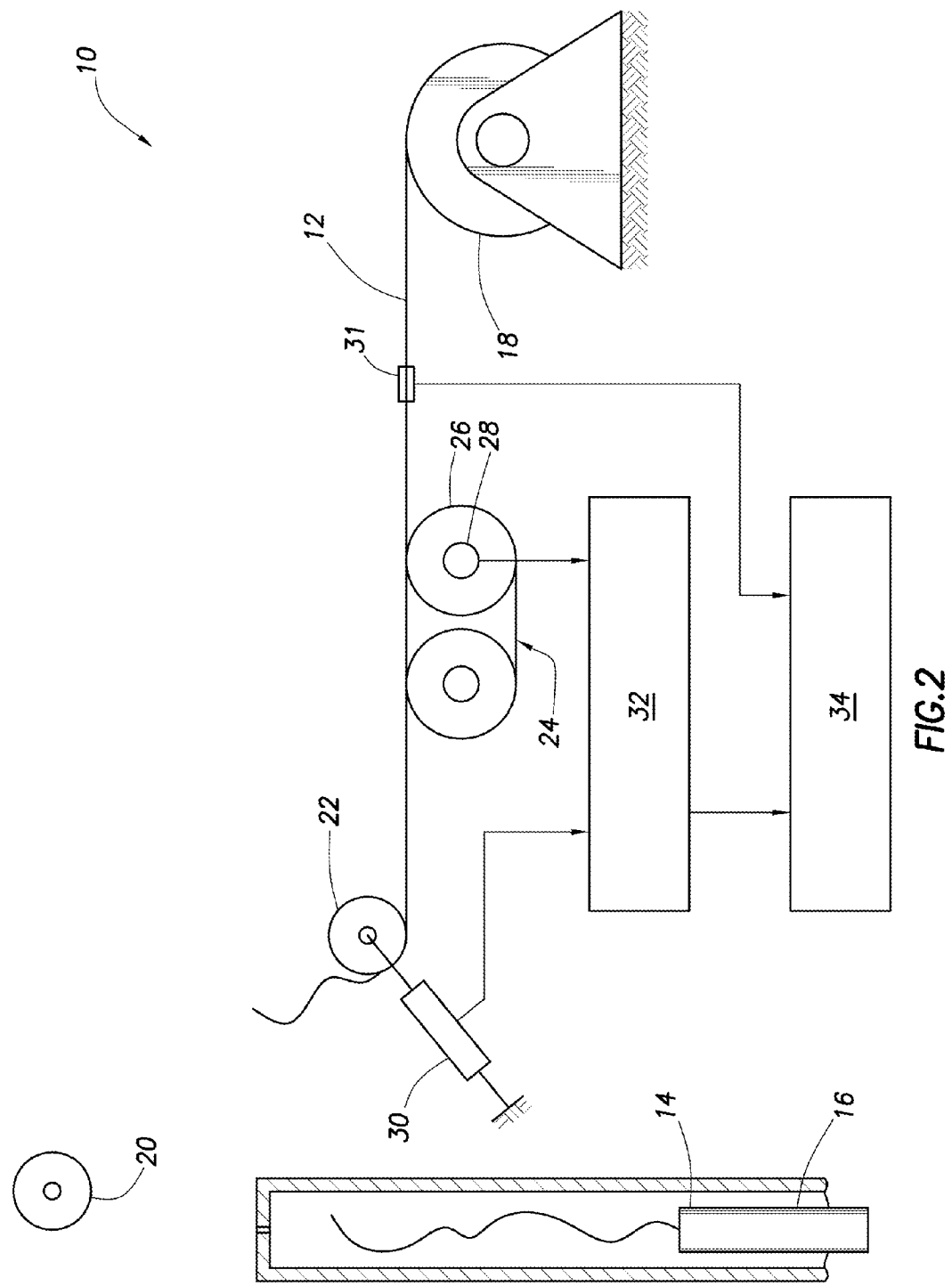
FIG. 2 is a schematic view of the line management system, showing a line failure to be avoided by the system.

In FIG. 2, the system 10 is depicted after failure of the line 12. This occurrence of failure is to be avoided in the system 10 by providing a real-time (i.e., as the line 12 is being used in an operation) evaluation of the used life of the line. Using this information, an operator can intelligently decide when and if remedial measures (such as replacing the line 12, reversing the line, discarding a portion of the line, etc.) should be taken to prevent failure of the line.

Based on laboratory tests and field data, it is possible to predict how the life of a line is affected by conditions such as bending stresses, tensile stresses, fatigue, etc. Techniques such as regression analysis or virtual intelligence systems (e.g., genetic algorithms, neural networks, fuzzy logic, etc.) can be used to effectively model the reduction in useful life (or increase in used life) of a line due to conditions experienced by the line.

In the system 10, a variety of data is collected for each incremental section of the line 12 during each operation using the line. This data is accumulated substantially continuously as the line 12 is used in an operation, so that a real-time evaluation of the used life of the line can be provided as the line is being used. In evaluating the used life of the line 12, the accumulated data is input to a mathematical model of the response of the line to the conditions experienced by the line.

In one embodiment of the model, the data includes for each section of the line 12 an identification of the particular operation or job number, an identification of the particular section of the line, an experimentally derived fatigue rating for the particular line type, an experimentally derived fatigue adjustment factor, a minimum sheave size (based on the smallest of the sheaves 20, 22 and the counter wheel 26), maximum load applied to the line, line diameter, overall length of the line when new, section length, length from reel end of line to counter wheel, an experimentally derived depth compensation, average jarring stroke, number of runs, average jarring time per run, average number of jars per minute, location of any line defect, a length of line section to derate due to defect, and an experimentally derived ratio by which to derate the line section due to the defect.

The experimentally derived factors can be obtained by a person of ordinary skill in the art without undue experimentation. The different line diameters, materials, treatments, sheave diameters, etc. available make it necessary to perform such experimentation in order to tailor the mathematical model to the particular circumstances presented. However, once the experimentally derived factors are obtained and the mathematical model is produced, the used life of the line 12 can be readily determined based on the accumulated data.

In the system 10, the outputs of the sensors 28, 30 are input to a measurement system 32. The measurement system 32 evaluates the outputs of the sensors 28, 30 so that, for example, the biasing force detected by the sensor 30 is related to load applied to the line 12, rotational displacement detected by the sensor 28 is related to direction, speed and total displacement of the line 12, etc.

An output of the measurement system 32 is input to a computing device 34 for evaluation of the used life of the line 12 as described above and in further detail below. The output of the measurement system 32 may also be displayed locally to an operator and/or remotely to other observers, such as via satellite, the Internet, etc.

An optional sensor 31 (such as an eddy current sensor) could be added to the system 10. This sensor 31 could measure the diameter of the line 12 or could detect defects like small cracks or changes in the physical properties of the line. The data from this sensor 31 could be connected directly to the computing device 34. The data from sensor 31 could be combined with the data from the measurement system 32 to evaluate the used life of the line 12. It will be appreciated that the data from sensor 31 could be used in the evaluation of the used life of the line 12 by running the line separately through sensor 31 before a job is executed. Also, additional test results could be considered to evaluate the life of line 12, such as visual inspection, line bend test, line knot test, coil test, API 9A torsion (twist) test, and other similar tests.

Although the measurement system 32 is depicted in FIGS. 1 & 2 as being separate from the computing device 34, it will be appreciated that these elements could be combined, or the functions provided by these elements could be further separated into additional elements. For example, the computing device 34 could in practice have separate data storage, data processing and display elements, any of which could be remotely located relative to any of the other elements. Thus, it is not necessary in keeping with the principles of the invention for the computing device 34 or any portion thereof to be positioned in a single location, or to perform only the functions described herein.

Figure 3:
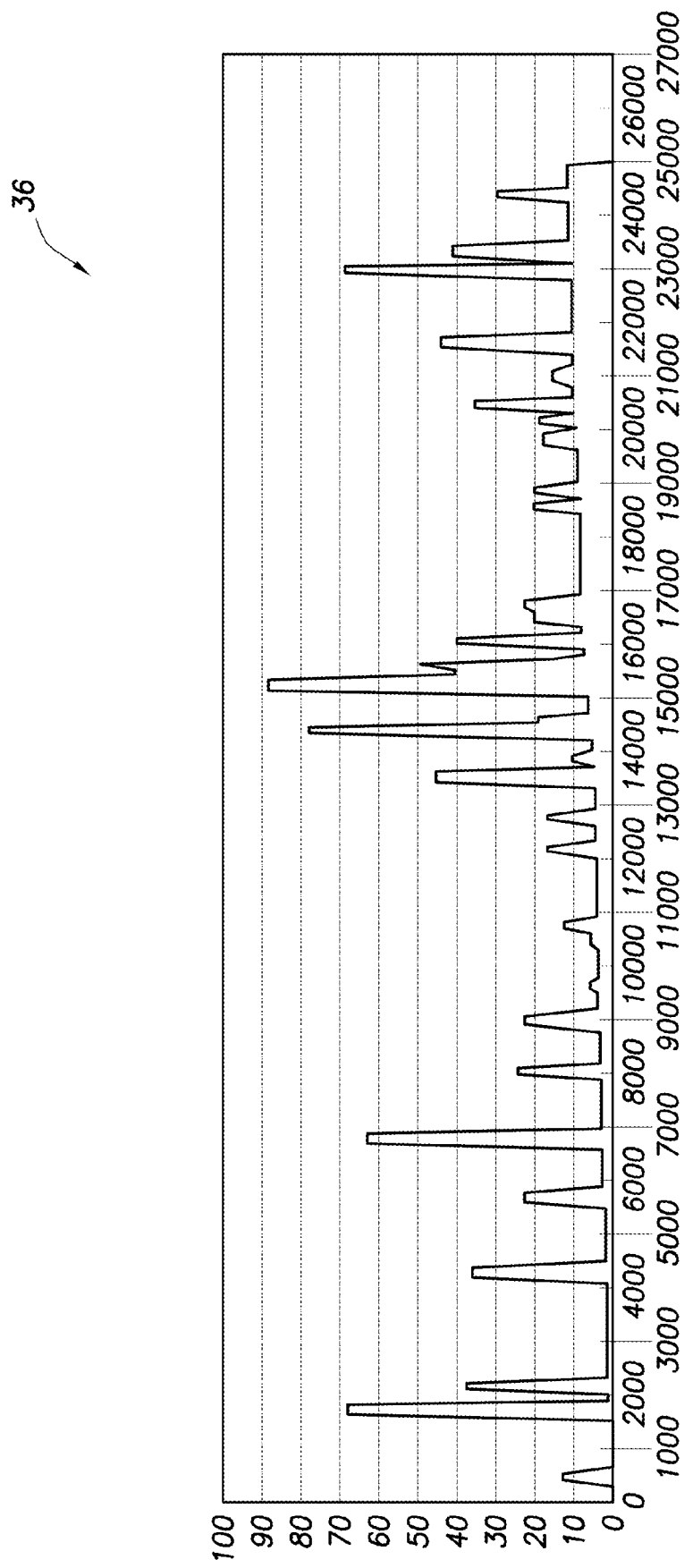
FIG. 3 is a real-time display provided by the line management system, showing a used life of the line along a length of the line.

Preferably, the evaluation of the used life of the line 12 is provided by the computing device 34 to the local operator and/or remote observers as a graphic display of the used life of each section of the line. An example of such a graphic display 36 is illustrated in FIG. 3. The vertical axis in this display 36 represents percentage of used life, and the horizontal axis represents length along the line 12 in feet, with the end of the line attached to the core of the reel 18 being at 0 feet and a terminal end of the line connected to the well tools 16 being at 25,000 feet.

Note that 25,000 feet is only an example of a length of the line 12 which can be used in the system 10. The used life of the line 12 is based in part on any accumulated data from previous jobs performed with the same line. The accumulated data contains the usage history of the line 12, results from tests performed on the line and the initial condition of the line to be used for future jobs.

Of course, a wide variety of formats exist for presenting the evaluation of used life of the line 12 to an operator or other observer, and the display 36 is merely one example of a useful format. Any other type of format or display, whether graphic, textual or any other form or combination of forms, may be used in keeping with the principles of the invention.

Note that at 8,000 feet the display 36 indicates that approximately 25% of the life of the line 12 has been used. Conversely, this also means that at this section of the line 12, approximately 75% of the life of the line remains. Ordinarily, this would be of no concern.

However, at a section of the line 12 between 15,000 and 16,000 feet the display 36 indicates that approximately 88% of the life of the line 12 has been used. This is very valuable information to an operator who may be planning to perform an operation, such as jarring, in which substantial stresses will be applied to this same section of the line 12.

Figure 4:
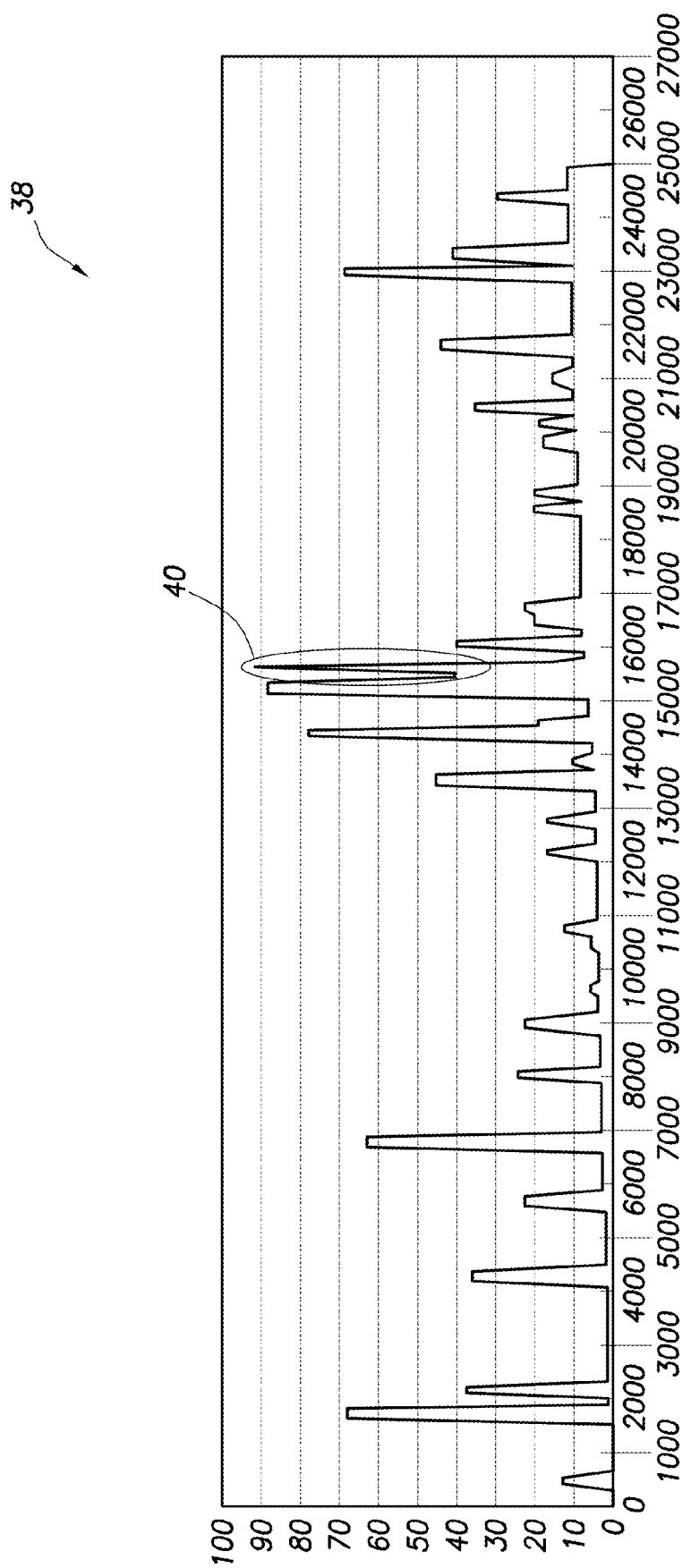
FIG. 4 is a real-time display provided by the line management system, showing a circumstance in which an alert may be given by the system.

In FIG. 4, another display 38 is illustrated. This display 38 shows the change in the used life of the line 12 due to, for example, a jarring operation in which substantial stresses were subsequently applied to a section of the line at approximately 15,600 feet (indicated by the oval 40).

At this point in the operation, approximately 90% of the life of the line 12 at this section has been used. Preferably, the computing device 34 provides an alert (such as a visual or audible alarm, warning, etc.) to the operator and/or other observer when a predetermined used life limit for the line 12 has been reached.

In this case, the used life limit for the line 12 could be set at 90%. During the operation, when the 90% of the life of the line 12 at the section at 15,600 feet is reached, the operator and/or other observer is provided with an alert, so that the operator will know to cease the operation and take remedial measures to prevent failure of the line.

In this manner, failure of the line 12 can be prevented in real-time, during an operation, and without having to rely on error-prone entry of data after the fact. Instead, the data used to evaluate the used life of each section of the line 12 is entered automatically as the operation progresses, for example, using the outputs of the sensors 28, 30 which are input to the computing device 34 via the measurement system 32, and the operator is provided with a real-time display of the used life of each section of the line.

The system 10 can also be used to help determine what remedial measures should be taken to avoid failure of the line 12. In this case, the operator can input to the computing device 34 an estimate of the conditions which will be experienced by the line 12 if the operation continues, but with, for example, 100 feet of the terminal end of the line discarded (e.g., removed by cutting the line).

Figure 5:
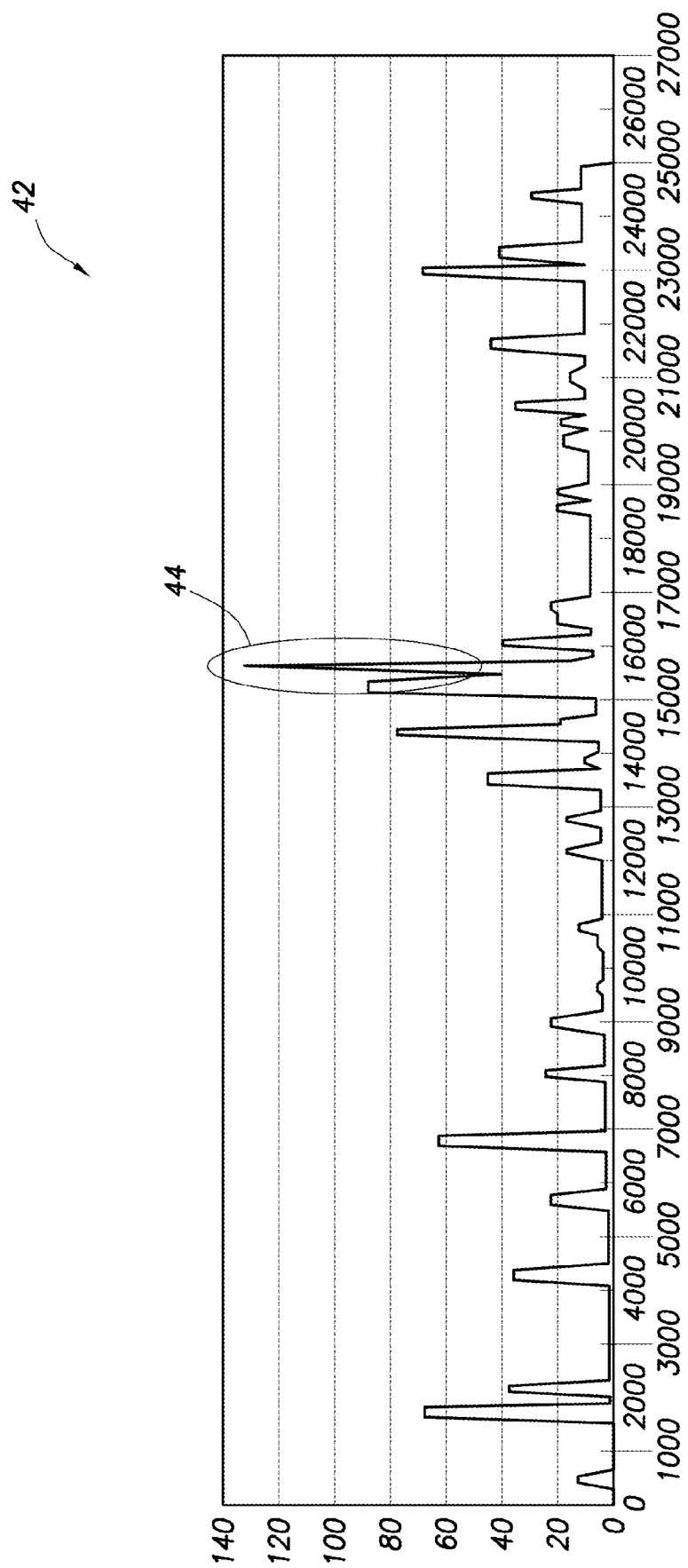
FIG. 5 is a display provided by the line management system, showing a predicted used life of the line if projected future conditions are applied to the line during an operation.

A resulting display 42 is representatively illustrated in FIG. 5. The computing device 34 (using the estimated conditions input by the operator, the accumulated data from prior operations and the current operation, and the model described above) in response provides the display 42 which indicates that at approximately 15,700 feet the used life of the line will be over 130% (indicated within the oval 44). This indicates to the operator that failure of the line 12 is likely if the operation is continued after discarding 100 feet of the line.

Figure 6:
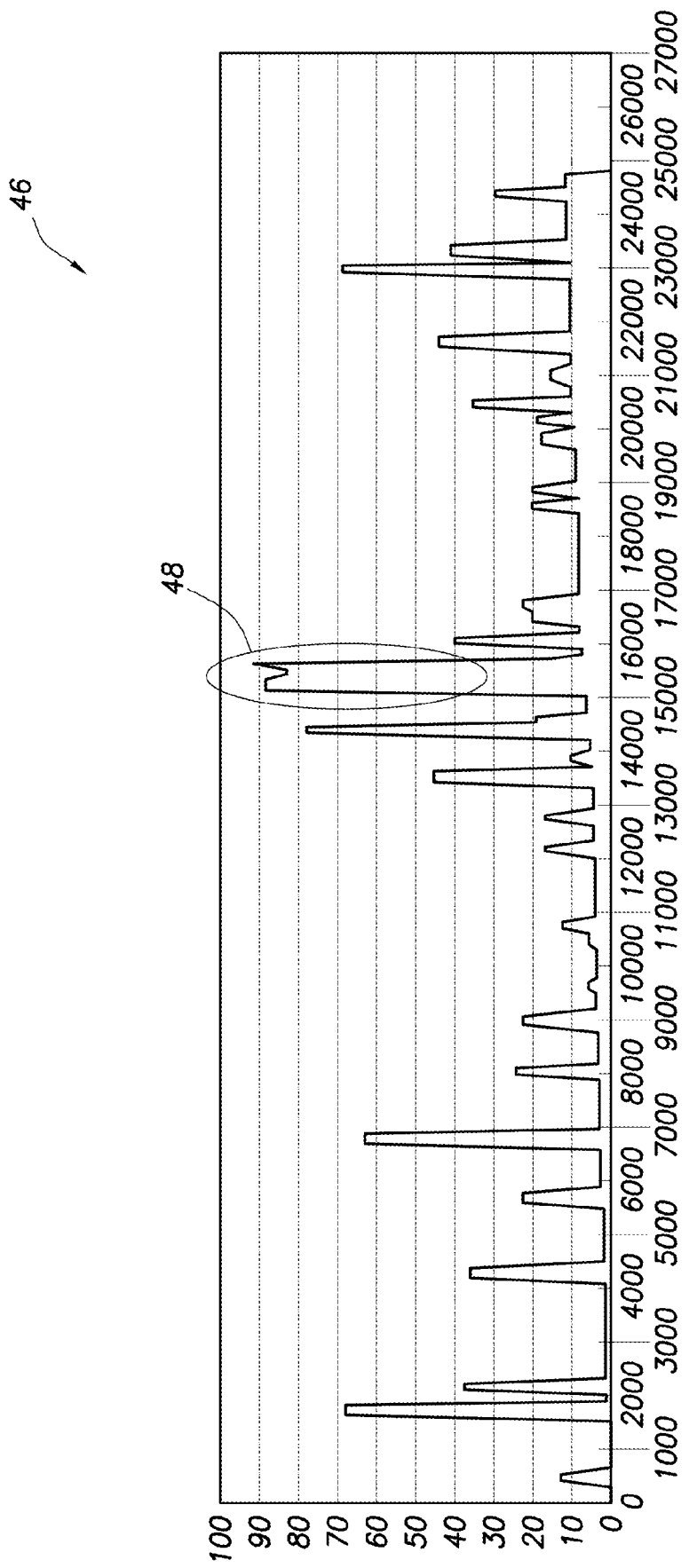
FIG. 6 is a display provided by the line management system, showing an improved predicted used life of the line if a certain length of the line is discarded and projected future conditions are applied to the line during an operation.

The operator can then evaluate alternative remedial measures, such as discarding a total of 200 feet of the line 12 prior to continuing the operation. A resulting display 46 is representatively illustrated in FIG. 6. This display 46 indicates that at approximately 15,800 feet the used life of the line will be slightly more than 90% (indicated within the oval 48).

Based on this prediction, the operator may decide to choose the option of discarding 200 feet of the line 12 prior to continuing the operation. It could also be possible that additional iterations to discard additional line may be required, and as a result the operator may discard, for example, 300 or more feet of line. Another option could be to reverse the line if an excessive length of the line should be removed. If during the remainder of the operation the used life of the line 12 should reach 90% or more, the operator will be provided with an alert, so further remedial measures can be considered at that point.

Of course, it is not necessary that such predictions be made only during an interrupted operation. For example, based on the accumulated data from past operations and estimates of conditions to be applied to the line 12 in respective future operations, the future operations can be planned beforehand to minimize what the used life of the line will be after the future operations are performed.

In one example, a sequence in which the future operations are performed can be determined so that the predicted used life of the line 12 is minimized. For example, if the future operations are denominated A, B and C, it may be advantageous to perform the C operation prior to the A operation, and then perform the B operation after the A operation, because this sequence more evenly distributes stresses along the length of the line 12.

In another example, a determination can be made as to what point in the future operations the line 12 should be reversed so that the predicted used life of the line is minimized. Reversing the line 12 (spooling the line on another reel so that the former terminal distal end is now attached to the core of the reel) is a remedial measure which can be used to change the section of the line 12 to which stresses will be applied in a future operation. Thus, for example, it might be determined that the used life of the line 12 could be minimized by reversing the line between the B and A future operations.

In yet another example, a determination can be made as to what point in the future operations lengths of the line 12 should be discarded so that the predicted used life of the line is minimized. As discussed above, discarding an appropriate length of the line 12 can be an effective remedial measure to reduce a predicted used life of the line in a future operation. Thus, for example, it might be determined that a certain length of the line 12 should be discarded between each of the successive future operations, or between particular future operations, in order to minimize the predicted used life of the line.

Note that the effect of any combination of proposed remedial measures on the predicted used life of the line 12 can be determined using the principles of the invention. In this manner, the future operations can be accurately planned with remedial measures determined in advance, so that the used life of the line 12 after the future operations is minimized. Furthermore, after the future operations have commenced and additional data has been accumulated, the plan can be readily re-evaluated to determine whether any adjustments should be made to the plan.

Figure 7:
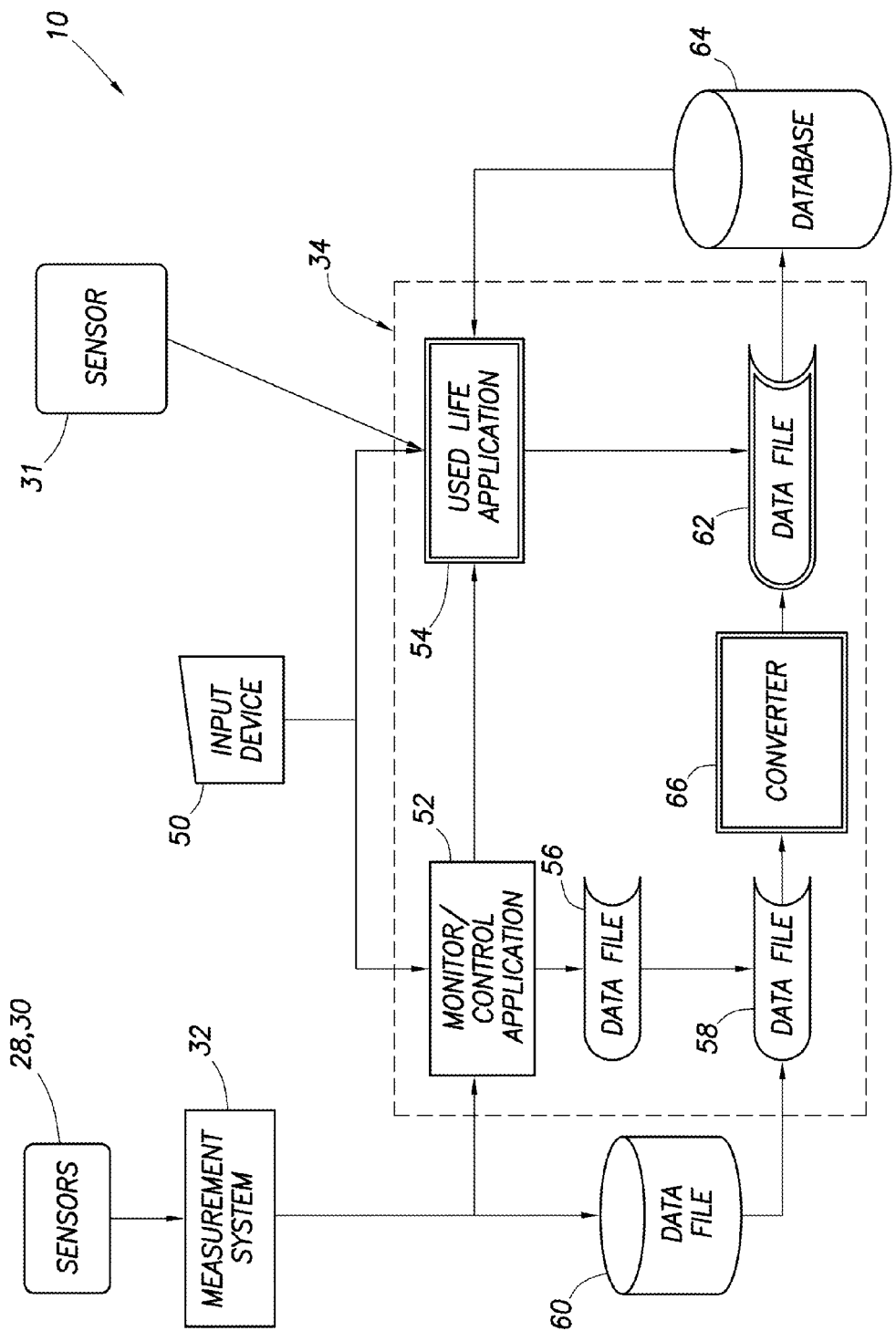
FIG. 7 is a schematic view of data flow and accumulation in the line management system.

Referring additionally now to FIG. 7, a flowchart is depicted which schematically illustrates the manner in which data is acquired, stored, accumulated, utilized and displayed in one example of the system 10. The flowchart illustrates several alternate data flowpaths, and it should be understood that it is not necessary for all or any particular combination of these flowpaths to be used in keeping with the principles of the invention.

In the simplified example depicted in FIG. 7, there are several sources of the data used in the system 10. The sensors 28, 30 provide their outputs to the measurement system 32 as described above. Based on these sensor inputs, the measurement system 32 determines the load applied to the line 12, the position, speed and direction of the line, etc. Other sensors and other types of sensors can be used as data sources in keeping with the principles of the invention. Also, additional sensors could be connected to related applications, such as the optional sensor 31 connected to application 54 described below.

Another source of the data used in the system 10 is a data input device 50 which enables an operator to input data such as parameters descriptive of the operation (e.g., operation name, type, sheave diameters, other conditions in the operation, etc.) and parameters descriptive of the line 12 (e.g., the line type, diameter, any defects and their locations, fatigue rating, length, other characteristics of the line, etc.). Other data and other types of data can be input by an operator in keeping with the principles of the invention.

The input device 50 can be any type or combination of input devices, for example, a keyboard, touch screen, mouse, graphic user interface, etc. In addition, it is not necessary for an operator to originate the data, since it could have been previously stored using a data storage device (such as a memory chip, disk drive, etc.), in which case the input device 50 could be a data reader, computer port, or any other type of device which can access the stored data.

The data from the measurement system 32 and the data from the input device 50 are input to applications 52, 54 running on the computing device 34. The application 52 is used for monitoring and controlling certain aspects of an operation, such as direction and speed of the line 12, pull on the line, etc. Application 54 running on the computing device 34 is used for determining and predicting in real-time the used life of the line 12 as described above. The data from the measurement system 32 and the data from the input device 50 are also input to the application 54, as well as any relevant data generated by the application 52. Preferably, the applications 52, 54 each have access to the data from the measurement system 32 and input device 50 via, for example, a serial bus or shared memory.

The application 52 generates a data file 56 used in the computing device 34 for, among other things, displaying to the operator and/or remote observer current conditions during an operation, such as load on the line, speed and direction of the line, etc. This data generated by the application 52 can also be output from the computing device 34 as another data file 58 for remote storage, later use, etc.

Note that the data from the measurement system 32 may also be directly output as a data file 60. This data file 60 could, for example, be stored on a memory card or other data storage device of the measurement system 32. The stored data file 60 could later be incorporated into the data file 58 via data conversion, etc.

As described above, the application 54 determines the used life of the line 12. The application 54 also generates a data file 62 which includes the data accumulated from past operations and the current operation, and data indicating the used life of the line 12.

This data file 62 is very significant because it contains information detailing the history of the line 12 and its current state, including the used life of each section of the line. By accessing this data file 62, a user of the line 12 can be provided with all of the information needed to obtain an accurate appreciation of the current condition of the line based on its actual operational history, as well as to predict its performance in future operations or in continuation of a current operation.

Preferably, the data file 62 output from the computing device 34 is stored in another central database 64 which could, for example, include the data files for multiple different lines. The data file for a particular line can be accessed, for example, prior to putting the line in service for an operation or series of operations. In that case, the data file for a particular line can be retrieved from the database 64 and input to the application 54 in the computing device 34 prior to performing an operation using the line.

Another method of generating the data file 62 could be to convert the data file 58 using a data converter 66. Of course, many other methods of generating the data file 62 and otherwise handling data flow in the system 10 could be used in keeping with the principles of the invention. For example, the applications 52, 54 could be incorporated into a single application; the applications 52, 54 could cooperate to generate the data file 62, etc.

Figure 8:
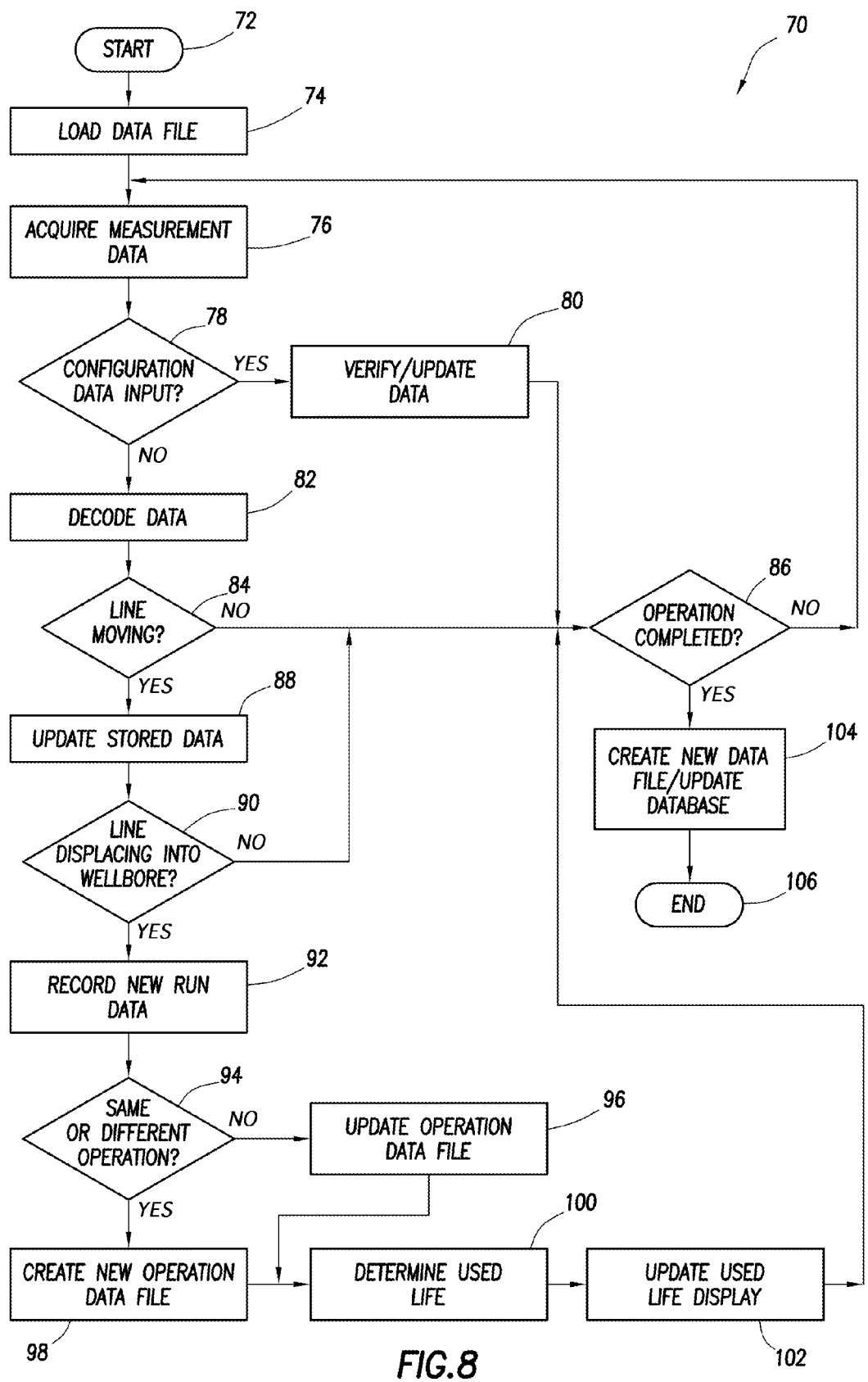
FIG. 8 is a flowchart of steps in a line management method wherein the used life of the line is determined.

Referring additionally now to FIG. 8, a flowchart of steps in a method 70 of determining the used life of a line is representatively illustrated. The method 70 is preferably utilized as part of the application 54 in the system 10, but it should be understood that other methods could be used in the system 10, and the method 70 could be used in other systems, in keeping with the principles of the invention.

Step 72 is a start of the method 70 and includes normal initialization procedures, etc.

Step 74 includes loading any prior data file 62 from the database 64 for the line 12. As described above, the data file 62 includes data indicating conditions experienced by the line 12 in prior operations, characteristics of the line, etc., so that the history of use of the line and its current state can be readily and accurately known. If additional test data related to the condition of the line is available, it should be entered in step 74. An example of individual test data are the results of visual inspection, line bend test, line knot test, coil test, API 9A torsion (twist) test, eddy current test, etc. If additional conditions of the line changed, these should be entered in step 74. Examples of line changes include cutting a specific length of line, reversing the line, etc.

Step 76 includes acquiring data from the measurement system 32, from the optional sensor 31 and from the input device 50. This data can include information such as loads applied to the line 12, speed, direction and position of the line, and information relating to the characteristics of the operation and the particular configuration in which the line is used in the operation. As depicted in FIG. 7, the data from measurement system 32 could be acquired through application 52, or the data could be acquired directly from the measurement system to the data file 60.

In step 78, if the data input in step 76 includes configuration data, the data is verified and the current configuration data is updated with the new configuration data. This verification and updating is performed in step 80, and continuing later to step 86, where a determination is made as to whether the operation is yet completed. If the operation is not yet completed, then the method 70 returns to step 76 for further acquisition of data.

If the data input in step 76 includes information relating to conditions experienced by the line 12, such as loads applied to the line, speed, position and direction of the line, etc., this data is decoded in step 82. For example, the decoding step 82 may include placing the data in a form which may be more conveniently used in the remainder of the method 70.

In step 84, a determination is made as to whether the line 12 is currently moving. If not, then in step 86, as described above, a determination is made as to whether the operation is completed.

If the line 12 is moving, then in step 88 stored data for the operation, such as maximum depth, tension on the line and speed, etc. are updated.

In step 90 a determination is made as to whether the line 12 has reversed direction and is currently displacing into the wellbore 14, i.e., being spooled from the reel 18. If so, then it is considered that a new run has been initiated, and the characteristics of this new run (such as initial and maximum depth of the run, maximum tension in the line and maximum speed of the line in the run, etc.) are recorded/updated in step 92.

If a new run has not been initiated, then the method 70 proceeds to step 86 in which, as described above, a determination is made as to whether the operation is completed. Note that an operation can include any number of runs of the line 12. In particular, if the operation includes repeated jarring, then the operation can include a large number of runs. Data is recorded/updated for each new run in step 92.

In step 94 a determination is made as to whether the current run is part of the same or a different operation. If the run is part of the same operation, the operation data file is updated in step 96. If the run is part of a new operation, the data for the run is used to create the new operation data file in step 98.

In step 100 a determination of the used life of each section of the line 12 is made. This determination is based on the current operation data, as well as the accumulated data from any previous operations (e.g., as stored in the data file 62) using the mathematical model described above. The data file 62 is updated with the current operation data and current determination of used life of the line 12.

In step 102 a display of the used life of the line 12 (such as the displays illustrated in FIGS. 3-6) is updated with the current determination from step 100. In addition, any alerts resulting from a predetermined used life limit for the line 12 having been reached may be displayed or otherwise provided to the operator and/or any remote observer.

Once the display has been updated the method 70 proceeds to step 86 for a determination whether the operation is completed. If at any time in the method 70 the determination is affirmative that the operation is completed, the method proceeds to step 104 which includes creating a new data file 62 (which is the previous data file as updated in step 100), and updating the database 64 with the new data file.

Step 106 is an end of the method 70.

Figure 9:
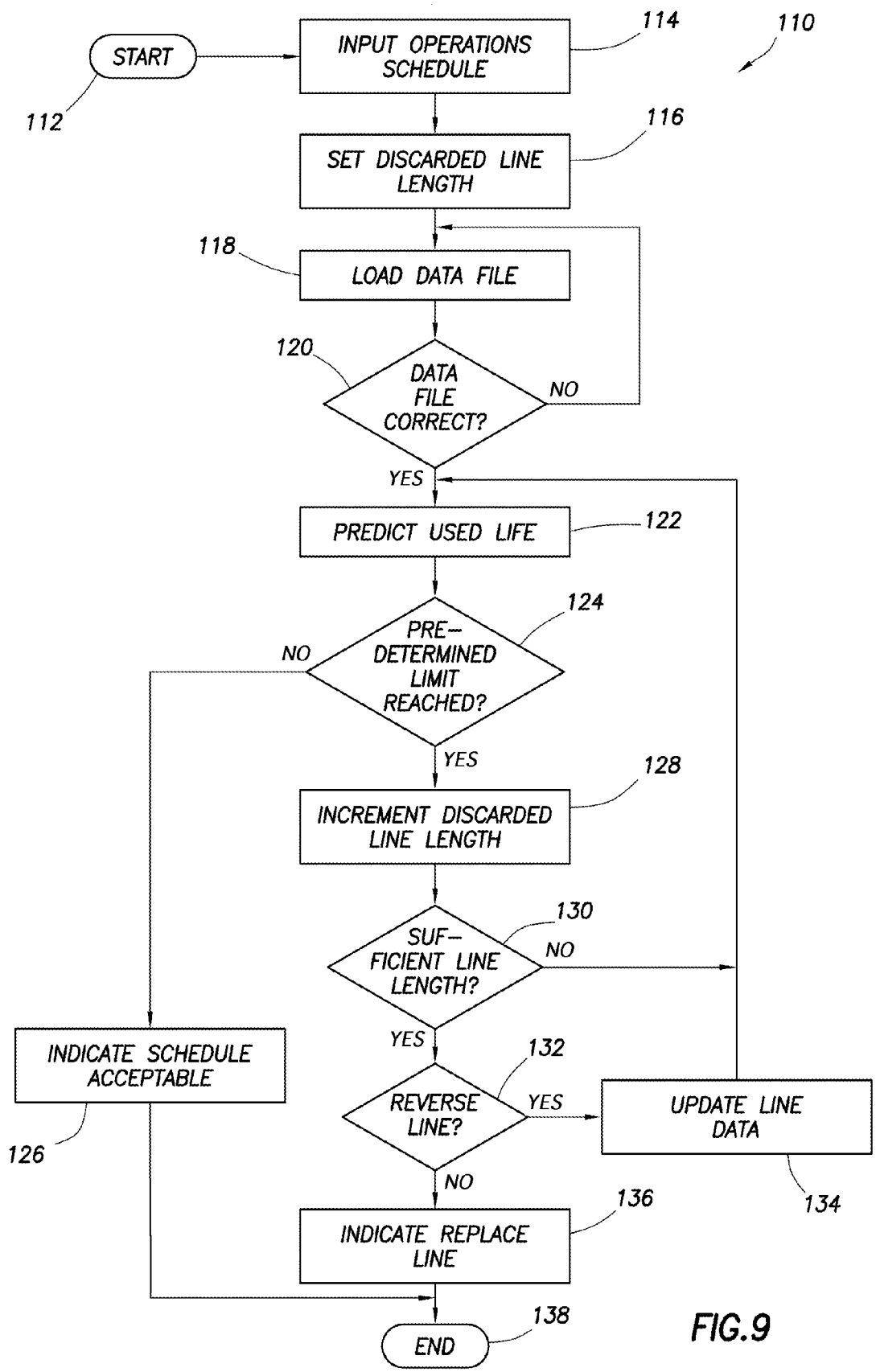
FIG. 9 is a flowchart of steps in the line management method wherein a predicted used life of the line after future operations is minimized.

Referring additionally now to FIG. 9, a flowchart representatively illustrating steps in another method 110 is provided. This method 110 is an example of how future operations using the line 12 can be planned before the future operations to minimize the used life of the line after the future operations. As with the method 70 described above, this method 110 is preferably performed in the system 10, but it should be understood that the method could be performed using other systems, for example at a centralized planning location, and the system 10 does not necessarily use the method, in keeping with the principles of the invention.

Step 112 is a start of the method 110 and includes normal initialization procedures, etc.

Step 114 includes inputting a schedule of future operations, the schedule including an order in which the operations are to be performed. This schedule also includes estimated conditions to be experienced by the line 12 in each of the future operations.

In some circumstances, the order in which the future operations are to be performed cannot be changed due, for example, to external time constraints, etc. However, where it is possible to perform the future operations in various orders, the method 110 could be used for each possible order of the future operations, and the best result predicted by the method (e.g., the order resulting in the least used life of the line 12 after the future operations) could then be used to select the preferred order in which to perform the future operations.

Step 116 includes setting a length of the line 12 to be discarded between successive future operations at an initial value of zero. It is preferred that the future operations be planned so that discarding lengths of the line 12 can be avoided, and so this step results in an initial assumption that no line is to be discarded. This assumption can be changed further in the method 110, as described below.

Step 118 includes loading the data file 62 for the line 12 to be used in the future operations. A display of the current used life of the line 12 may be provided, with any alerts in the event that a predetermined used life limit for the line has already been reached. This provides an opportunity to evaluate the current status of the line 12 prior to the future operations being planned.

In step 120 a determination is made as to whether the data file 62 is correct. If not, or if a decision is made to use a different line, then the correct or different data file is loaded in step 118.

Once the correct data file 62 is loaded, the used life of the line 12 is determined after the future operations in step 122. Based on the existing data file 62 and the estimated conditions to be experienced by the line 12 in the future operations, and using the mathematical model as described above, the used life of each section of the line 12 is predicted. The display of used life of the line 12 is updated and any alerts are provided if the predicted used life of the line reaches the predetermined limit.

In step 124 a determination is made as to whether the predicted used life of the line 12 did indeed reach the predetermined limit. If not, then in step 126 the schedule of future operations input in step 114 is indicated as being acceptable. If the predicted used life of the line 12 did reach the predetermined limit in step 122, then in step 128 the length of line to be discarded between successive future operations is incrementally increased.

In step 130 a determination is made as to whether the line 12 would have a sufficient length to perform the future operations with the increased length of line to be discarded as set in step 128. If not, then in step 132 a determination is made whether to reverse the line 12 instead of incrementally increasing the length of line to be discarded.

Reversing the line 12 is substantially more time-consuming and requires additional equipment as compared to discarding a length of the line between future operations. Thus, the method 110 attempts to prevent reaching a used life limit of the line by planning for discarding a length of the line between future operations rather than planning for reversing the line, and only planning for reversing the line if discarding a length of line between future operations is an unsatisfactory solution.

If in step 130 it is determined that the line 12 would have a sufficient length to perform the future operations with the increased length of line to be discarded as set in step 128, then the method 110 returns to step 122 for an updated prediction of the used life of the line 12 after the future operations.

If in step 132 it is determined that the line 12 is not to be reversed, then in step 136 it is indicated that the line should be replaced. If in step 132 it is determined that the line 12 is to be reversed, then in step 134 the line data is updated to indicate the reversed line, the length of the line to be discarded between successive future operations is again set to zero, and the method 110 returns to step 122 for an updated prediction of the used life of the reversed line 12 after the future operations.

If in the method 110 performed for a particular line the line is not replaced, then eventually in step 124 it will be determined that the predicted used life of the line will not reach the predetermined limit, and in step 126 the schedule of future operations input in step 114 will be indicated as acceptable (with any lengths of the line to be discarded and any reversals of the line). A display and/or printout may be provided showing the acceptable order of the future operations, the length of line to be discarded between successive future operations, and whether the line should be reversed.

Step 138 is an end of the method 110.

In the above description of examples of the invention, the used life of the line 12 (including the used life of each section of the line) is determined using various methods and systems. Note that the determination of the used life of the line 12 is considered to be analogous to determination of the remaining useful life of the line, since the two are complementary (i.e., as the used life increases the remaining useful life decreases).

Thus, it is not necessary in keeping with the principles of the invention for a line management system to specifically display a used life of the line 12. For example, by providing an indication of the remaining useful life of the line, an indication of the used life of the line is also indicated.

Used life of the line and remaining useful life of the line can be indicated in a variety of ways. In FIGS. 3-6, used life is indicated as a percentage of the total life of the line which has been used, but it should be understood that any manner of indicating used life or remaining useful life can be provided in keeping with the principles of the invention.

Of course, a person skilled in the art would, upon a careful consideration of the above description of representative embodiments of the invention, readily appreciate that many modifications, additions, substitutions, deletions, and other changes may be made to these specific embodiments, and such changes are within the scope of the principles of the present invention. Accordingly, the foregoing detailed description is to be clearly understood as being given by way of illustration and example only, the spirit and scope of the present invention being limited solely by the appended claims and their equivalents.

What is claimed is:

1. A method of managing a line which is used in multiple operations in one or more subterranean wells, the operations including at least one future operation, the method comprising the steps of:

inputting to a computing device estimated conditions which will be experienced by the line during the future operation; and the computing device predicting before the future operation what a used life of the line will be after the line is used in the future operation.

2. The method of claim 1, further comprising the step of minimizing before multiple future operations what the predicted used life of the line will be after the line is used in the multiple future operations.

3. The method of claim 2, wherein the minimizing step further includes determining a sequence in which the multiple future operations should be performed to minimize the predicted used life of the line.

4. The method of claim 2, wherein the minimizing step further includes determining at what point in the future operations the line should be reversed to minimize the predicted used life of the line.

5. The method of claim 2, wherein the minimizing step further includes determining a length of the line which should be discarded between the future operations to minimize the predicted used life of the line.

6. The method of claim 5, wherein the minimizing step further includes determining the future operations between which the length of the line should be discarded to minimize the predicted used life of the line.

* * * * *